United States Patent [19]

Angehrn

[11] 4,320,470

[45] Mar. 16, 1982

[54] METHOD AND APPARATUS FOR ACOUSTIC WELL LOGGING

[75] Inventor: Jorg A. Angehrn, Houston, Tex.

[73] Assignee: Dresser Industries, Inc., Dallas, Tex.

[21] Appl. No.: 30,049

[22] Filed: Apr. 13, 1979

Related U.S. Application Data

[63] Continuation-in-part of Ser. No. 949,592, Oct. 10, 1978.

[51] Int. Cl.$^3$ .............................................. G01V 1/40
[52] U.S. Cl. ........................................ 367/34; 367/30
[58] Field of Search .................. 367/26, 28, 29, 34, 367/35, 30–32; 340/853, 856, 858; 328/115

[56] References Cited

U.S. PATENT DOCUMENTS

| | | | |
|---|---|---|---|
| 3,289,157 | 11/1966 | Brokaw | 367/34 |
| 3,322,229 | 5/1967 | Smith | 367/34 |
| 3,467,875 | 9/1969 | Engle | 367/34 |
| 3,506,813 | 4/1970 | Trimble | 367/28 |
| 3,654,562 | 4/1972 | Reilly, Jr. et al. | 328/115 |
| 4,040,001 | 8/1977 | Vivet et al. | 367/26 |
| 4,131,875 | 12/1978 | Ingram et al. | 367/35 |
| 4,140,994 | 2/1979 | Buckner | 367/28 |

Primary Examiner—Howard A. Birmiel
Attorney, Agent, or Firm—Richard M. Byron; Patrick H. McCollum

[57] ABSTRACT

An improved well logging technique is provided for more accurately deriving acoustic measurements of subsurface earth formations. Method and apparatus are described for converting an acoustic signature which can be generated on a depth dependent or time dependent basis, into digital format and subsequently employing special processing techniques to yield parameters such as velocity of the transmitted acoustic energy through earth formations and the amplitude of the received acoustic energy. Processing further allows for the generation of noise immunity signals functionally related to a measured signature parameter and for the generation of amplitude control signals. Additionally, a control signal is generated to optimize transmitter firing rate.

1 Claim, 7 Drawing Figures

METHOD AND APPARATUS FOR ACOUSTIC WELL LOGGING

This application is a continuation-in-part of our co-pending application Ser. No. 949,592, filed Oct. 10, 1978.

BACKGROUND OF THE INVENTION

This invention relates to improved methods and apparatus, for investigating the characteristics of subsurface earth formations traversed by a borehole, and more particularly relates to methods and apparatus for digitizing and processing an acoustic signature to determine selected formation characteristics.

It is well known that oil and gas are found in subsurface earth formations, and that wells are drilled into these formations to recover such surfaces. What is not generally known is that, for various reasons, the contents, if any, of most such formations do not automatically discharge into the well bore upon being penetrated. However, it is usually necessary to survey or "log" the entire length of the borehole to locate those formations of interest, before the well can be completed to produce the oil or gas.

There is no single well logging technique or device which can provide a direct indication of oil or gas in a particular formation of interest. Instead, the logging techniques which are most commonly used are those which measure various physical parameters of the earth substances adjacent the borehole, whereby such information can then be used according to selected functional relationships to determine which of those formations are of probable or possible value.

For example, it will be readily apparent that if the oil and gas are diffused or dispersed in the cavities or the pore spaces within a formation, then a formation of greater porosity will more likely contain producable amounts of oil or gas than will a formation of lesser porosity. Accordingly, an indication of the relative porosity of the earth materials along the borehole will obviously be of value in determining the depths at which oil and gas in suitable quantities for production will most likely be found.

Originally, well logging was performed by a sonde or logging "tool", which was merely suspended on the end of a logging cable, at the bottom of the borehole, and then was raised progressively through the borehole as it generated measurements of one or more earth parameters. Circuitry was usually provided in the sonde for converting such measurements into appropriate electrical signals which, in turn, were transmitted to the surface by one or more electrical conductors within the logging cable. Recording apparatus at the surface was provided to receive and record such signals in correlation with a suitable indication of the borehole depth at which the signals were derived.

As hereinbefore stated, various different logging techniques and apparatus have been devised and used in such manner, some being more suitable than others depending upon the different conditions existing in the borehole. For example, devices and techniques have long been used to measure the travel time or velocity of an acoustic pulse moving through such formations. In such cases, the measurements are usually transformed into electrical energy that is representative of the magnitude of this earth parameter being measured.

The earliest acoustic logging device, as shown in U.S. Pat. No. 2,651,027 issued Sept. 1, 1953 to C. B. Vogel, included a single acoustic transmitter and one acoustic receiver. The instrument provided an indication of the seismic wave velocity over a relatively large formation interval, such as five feet. A demand for increased accuracy in measurements and more detailed formation characteristics resulted in the development of the dual receiver acoustic logging tool.

The dual receiver acoustic logging tool consists of a single acoustic energy transmitter and two acoustic receivers spaced apart by some short distance, as for example one foot. This system measures the time required for acoustic energy to travel the distance equal to the separation of the pair of acoustic receivers. The acoustic transmitter is caused to emit energy which travels by way of the adjacent formations to the nearest receiver location. The time required for the acoustic energy to travel, by way of the adjacent formations, the distance between the near receiver and the far receiver location is measured, thus providing an indication of acoustic velocity for the area of the borehole formations located between the receiver stations. While an improvement, the dual receiver acoustic logging system proved less than desirable in that the information received was effected by the positioning of the instrument within the borehole. When the acoustic tool was in a tilted position in the borehole, unreliable velocity measurements resulted.

To provide a more accurate measurement of the acoustic characteristic of subsurface formations a dual transmitter - dual receiver acoustic instrument was introduced. This acoustic logging tool is equipped with an upper transmitter, an upper receiver, a lower receiver and a lower transmitter which are operated to obtain independent measurements representing acoustic energy traversing the formations from above and below the receivers and providing at least two time measurements which are averaged, yielding an average travel time. By this method the instrument compensates for such factors as tool position within the borehole.

The activation or "firing" of an acoustic transmitter of the well logging tool will cause a burst of acoustic energy to be radiated outwardly into the borehole and surrounding formations. The acoustic energy travels toward the receivers through the well fluid and the surrounding formations. Upon arriving at a receiver, the acoustic energy is converted by the receiver into an electrical signal, oscillatory in character, commonly referred to as an acoustic signature. The signature can be either processed within the instrument or telemetered to a surface location for processing to derive selected formation characteristics.

The processing of an acoustic signature has concentrated on several waveform characteristics to yield selected formation information. The amplitude of one or more oscillations of the acoustic signature waveform can be measured to provide an indication of formation fracturing or the quality of bonding of cement to a casing along a length of the cased borehole. Additionally, travel time of the acoustic wave through a formation interval can be calculated making a time based measurement over a selected portion of the acoustic signature. One method for measuring and calculating velocity, or the inverse travel time, can be found by reference to U.S. Pat. No. 3,257,639, issued June 21, 1966 to F. P. Kobesh.

In the prior art, velocity or travel time measuring has proved to be the most critical and most difficult measurement to make on an accurate and reliable basis. As hereinbefore mentioned, the acoustic signature is represented by an oscillating, or ringing electrical signal. The object is to measure a time from some fixed point on the signature, such as the instant of transmitter firing to a second point on the signature represented by the detection of acoustic energy generated by such transmitter firing arriving at a receiver location. The difficult measure point on the acoustic signature to reliably and consistantly determine is the arrival of the acoustic energy at the receiver location.

That portion of the acoustic signature representing the arrival of the transmitted acoustic energy at a receiver location is continually changing in character due to formation effects, noise generated due to the tool traversing the borehole and distortion caused by the transmission of the signature to a surface location through an electrical conductor within the logging cable. Changes in formation characteristics results in a continuously varying amplitude of the received electrical signal and a varying frequency of the oscillations generated in the detection of the transmitted energy. Early efforts made at detecting the second measuring point, on the representative received signal, were detected at detecting the point at which the first positive half-cycle of the received waveform crossed from a positive voltage level to a negative voltage level, or stated another way, crossed the zero voltage reference level. The measuring point was unsatisfactory due to distortion in the first half-cycle of received waveform. The distortion can be due to one or more of the factors hereinbefore described, and results in an inaccurate velocity and travel time calculation.

An alternative second measure point, was the first point of coincidence of the first half-cycle of received acoustic energy and a zero voltage reference level. This point was termed the "zero crossing point". Several factors in processing the analog acoustic signature, to determine the zero crossing point, resulted in a less than desirable measurement. At times the amplitude of the received signal varies enough that instead of detecting the first zero crossing point, the detection circuitry would jump or skip out in time along the acoustic signature to the second zero crossing point resulting in "cycle skippings" an an inaccurate measurement.

Additionally, the logging tool being dragged up the borehole on the end of a cable generated noise which could appear on the acoustic signature prior to the received signal. In such instance the point of detection would jump or move to detect the noise signal producing a velocity measurement more rapid than that of the formation encountered. Typically, these two instances of measurement point detection error were controlled by the operator visually monitoring the acoustic signature on an oscilloscope and manually adjust the system gain to obtain the proper detection point. In most instances the operator was unsuccessful in his attempts to make the required adjustments to obtain the degree of accuracy and reliability of the measurements desired.

To make the measurement more accurate a small threshold voltage circuit was added making the detection point not the first point of coincidence between the signature at a zero voltage reference level, but rather some small voltage level above the zero voltage level. This voltage level was selected to be above the level of most noise generated due to instrument movement.

While the threshold detection point has proven to be more satisfactory than the prior detection points, it still fails to provide the most accurate detection point possible for calculating velocity and travel time. The slope of the first half-cycle of the received signal is not a constant. This slope can change due to the aforementioned distortion resulting from the transmission of the signature to the surface by way of a conductor within the logging cable or can change as a result of formation effect upon the acoustic energy. By having a coincidence detection point above the zero voltage reference level changes in waveform slope are reflected as inaccuracies in velocity and travel time computations due a changing point of coincidence between the reference level and the acoustic waveform.

These and other disadvantages are overcome with the present invention by providing method and apparatus for converting an acoustic signature into a digital format and performing accurate and reliable determination of selected acoustic signature parameters.

SUMMARY OF THE INVENTION

In a preferred embodiment of the invention, a well logging system is provided which, in its overall concept includes a sonde which generates electrical representations of a selected plurality of physical characteristics of the formation surrounding a borehole, a logging cable for suspending and passing the sonde through the borehole past the formations of interest and appropriate circuitry at the surface for processing and recording data provided by the sonde. More particularly, the sonde will appropriately include circuitry which, in response to a command signal, will actuate or gate on one or more sensors or other circuits such as the acoustic transmitter or one or more acoustic receivers. Acoustic energy will be transmitted through an interval of subsurface formation where it will be detected by an acoustic receiver. The acoustic signature representative of the acoustic energy traveling through the formation interval is transmitted to a surface location.

Referring now to the surface portion of the system there is preferably included an improved means for detecting the arrival of the acoustic signature at the surface electronics and initiating an analog-to-digital converter to convert the analog acoustic signature into digital format. The converted digital acoustic signature is transferred to storage within the surface electronics whereby real-time data signals from the sonde are present for special processing.

The digital representation of the acoustic signature is sampled to locate a first reference point to be used in measuring the travel time of the formation interval through which the acoustic energy has traversed. The digitized signature is further analyzed to measure a second point representative of the arrival of acoustic energy at a receiver location. The time interval between the first reference point and the second measure point is then calculated to yield formation travel time or acoustic energy velocity through the formations. Additionally, a noise immunity gate is generated which is functionally related to the second measure point on the acoustic signature. On the subsequent cycle of the same transmitter-receiver pair the noise immunity gate causes all occurrences on the acoustic signature after the first reference point and before the noise immunity gate to be ignored. The noise immunity gate prevents the intrusion of unwanted signals into wave parameter calculations and as a result of being functionally related to an acoustic signature characteristic is continuously varying or floating.

The digital acoustic signature is further analyzed to provide an amplitude measurement of the received acoustic energy. The amplitude measurement is used in evaluating formation characteristics and to provide a control signal which will be used to adjust the gain of a binary gain amplifier to optimize the signal amplitude of subsequent received acoustic energy thereby assuring signal amplitudes are within a preferred amplitude range to be converted by the analog-to-digital convertor into digital format.

Additionally, when the amplitude of the received acoustic signature wave has exhausted to a zero voltage level, indication the expiration of the received signal, a control signal is generated which can be used to alter the firing rate of transmitters. The control signal can change the repetition rate of the transmitters when being actuated based on a time synchronized rate or can indicate that the speed at which the instrument is caused to traverse the borehole be changed when a depth synchronized firing rate is employed.

Accordingly, it is an feature of the present invention to provide improved method and apparatus for making acoustic measurements of subsurface earth formations.

It is also a feature of the present invention to provide improved well logging method and apparatus for generating a real-time electrical signal functionally related to the reception of acoustic energy transmitted through a predetermined distance of subsurface earth materials.

It is further a feature of the present invention to provide an improved method and apparatus for converting said real-time electrical signal into a digital representation of the configuration of acoustic energy therein.

It is another feature of the present invention to provide improved method and apparatus for converting said real-time electrical signal into a digital representation of the configuration of acoustic energy therein.

It is another feature of the present invention to provide improved method and apparatus for processing a digital representation of acoustic energy to yield a reliable indication of velocity and travel time of acoustic energy in subsurface earth formations.

It is also a feature of the present invention to provide improved method and apparatus for generating a noise immunity gate functionally related to a selected parameter of the received acoustic energy.

It is additionally a feature of the present invention to provide improved method and apparatus for measuring the amplitude of received acoustic energy and generate an amplitude control signal based on the measured amplitude.

It is a further feature of the present invention to provide improved method and apparatus for determining the cessation of received acoustic energy and to provide a signal to optimize the transmitter firing rate in response to cessation.

A particular feature of the present invention is to provide a method for determining the travel time of acoustic energy in subsurface earth formations traversed by a borehole by generating acoustic energy at a location within the borehole, detecting acoustic energy at a location within the borehole, detecting acoustic energy at a preselected distance from where it was generated, producing an electrical representation of the detected acoustic energy, transmitting the electrical representation to the surface location, deriving from the electrical representation a digital representation of the acoustic energy, determining from the digital representation first and second points functionally related to the velocity at which acoustic energy travels to the borehole.

Another feature of the present invention includes generating from the digital representation an amplitude control signal functionally related to the amplitude of the detected acoustic signal.

Another feature of the invention includes measuring the expiration of the acoustic energy and generating a control signal functionally related to the expiration for use in optimizing the rate at which acoustic energy is generated.

Another feature of the present invention includes generating a noise immunity gate functionally related to the second measure point of the digital representation of the acoustic energy. A further particular feature of the invention comprizes apparatus, including acoustic transmitter, acoustic receiver, A to D converter for converting electrical representation of acoustic energy into a digital representation, circuitry for determining from the digital signal first and second measure points which further yield the velocity of the acoustic energy in subsurface earth materials.

Another particular feature includes circuitry for generating from the digital representation of acoustic energy and amplitude control signal functionally related to the amplitude of the detected acoustic energy.

Another feature includes circuitry for determining the expiration of the received acoustic energy, an additional circuitry for generating electrical signal functionally related to the expiration of the detected acoustic energy to be used in optimizing the transmitter repetition rate.

Another feature of the present invention includes circuitry for generating a noise immunity gate which will be functionally related to the second measure point of the digital representation of the received acoustic energy.

A further particular feature has the transmitter acoustic logging instrument activated on a depth dependent basis.

These and other objects and advantages of the present invention can be understood from the following description of several techniques of practicing the invention described in conjunction with the following drawings.

BRIEF DESCRIPTION OF THE DRAWINGS

FIGS. 4a, 4b, and 4c graphically illustrate characteristics of an acoustic signature.

DETAILED DESCRIPTION OF THE DRAWINGS

Figure 1:
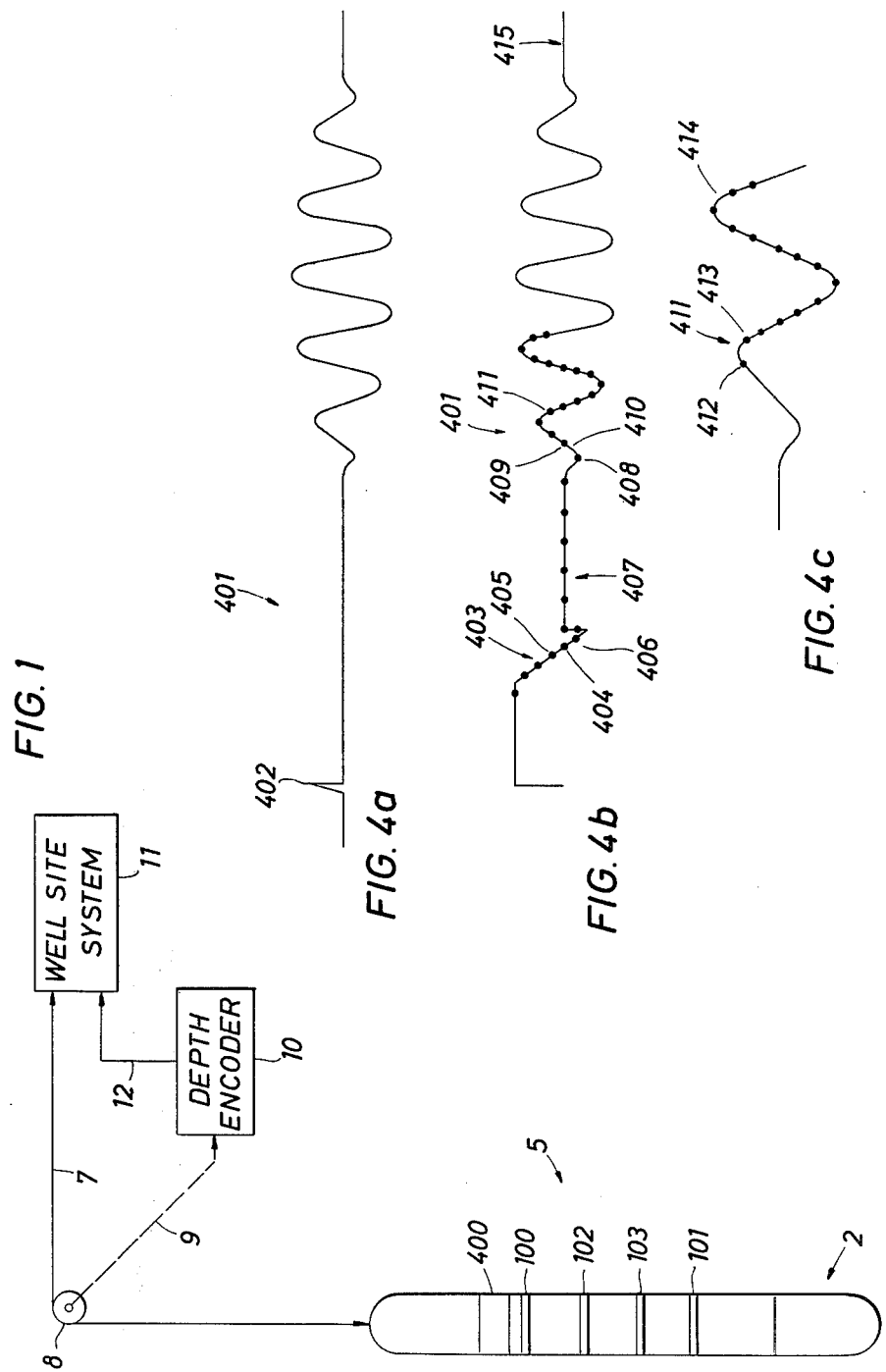
FIG. 1 is a simplified functional overall representation of an embodiment of the present invention.

Referring now to FIG. 1, there may be seen a simplified functional diagram of one embodiment of the present invention, and wherein there is more particularly shown the logging sonde 2 which may suitably include an acoustic logging section 5 arranged to provide appropriate measurements of the characteristics of formations surrounding a subsurface borehole (not depicted). Measurements from the logging sonde 2 may be conveniently transferred from the borehole to the surface by way of a conventional logging cable 7 which is arranged to rotate a sheave wheel 8, or the like, to provide a correlative indication of the borehole depth at which such measurements are taken. More particularly, the sheave wheel 8 may also be coupled to suitable depth encoder circuitry 10, by a drive shaft 9 or the like, whereby the depth encoder circuitry 10 will deliver a functionally correlative depth measurement signal 12 to the surface portion of the well site system 11, in conjunction with the measurements provided by the logging cable 7.

The acoustic well logging section 5 includes a first transmitting transducer ($T_1$) 100, a first receiving transducer ($R_1$) 102, a second receiving transducer ($R_2$) 103 and a second transmitting transducer ($T_2$) 101. The acoustic well logging section 5 also includes subsurface electronics 400 which will be explained with reference to FIG. 2.

It is well known in the prior art to provide borehole compensation by the use of two transmitters and two receivers through averaging techniques to compensate for wash-out in the borehole or similar anomalies. The borehole compensated tool with its two transmitter and two receivers require four successive cycles to complete one interval time measurement. This is due to the method of alternating receivers in order to transmit the received acoustic signals to the surface in their entirety. The sequence of making this one reading is as follows:

(1) Pulse transmitting transducer $T_1$ and measure the time for sound to travel to receiver $R_2$, this time is designated $T_1R_2$.

(2) Pulse $T_1$ again and measure time interval to receiver $R_1$, this time being designated $T_1R_1$.

(3) Pulse transmitter $T_2$ and measure the time for sound to travel to receiver $R_1$, this being designated $T_2R_1$.

(4) Pulse transmitter $T_2$ and measure the time for the acoustic energy to reach receiver $R_2$, being designated $T_2R_2$.

These measurements are combined in the manner shown below to obtain one complete measurement of the time interval between receivers $R_1$ and $R_2$:

$$T = (T_1R_2 - T_1R_1 + T_2R_1 - T_2R_2)/2$$

Figure 2:
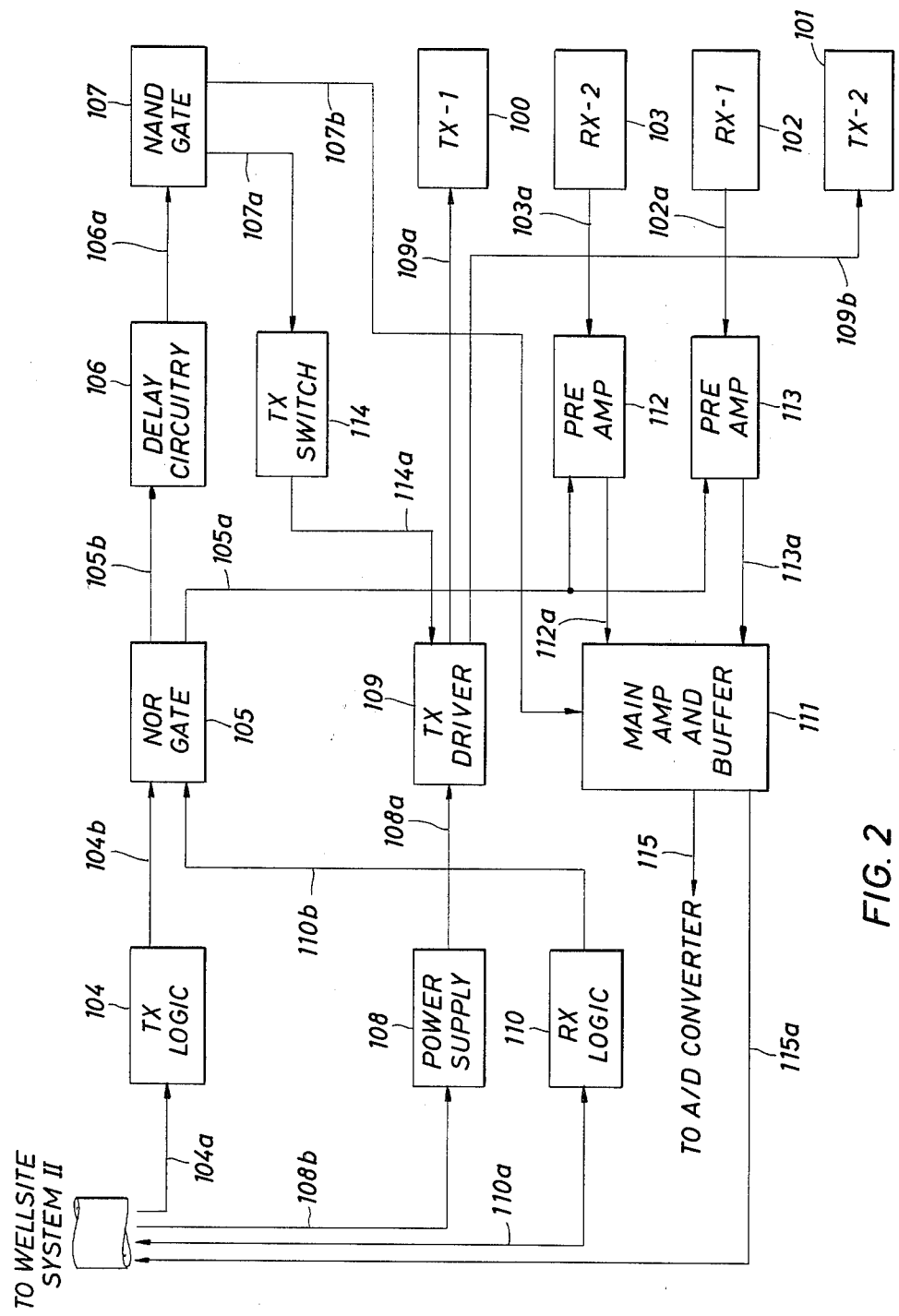
FIG. 2 is a more detailed function representation of a portion of the subsurface instrument depicted in FIG. 1.

Referring now to FIG. 2, there may be seen an acoustic logging section 5 of sonde 2 which may be employed with well site system 11 to measure sound transmission characteristics of formation strata penetrated by a well bore. These characteristics, in turn, may be functionally related to physical parameters useful in determining hydrocarbon content, such as porosity. As hereinbefore stated, in a typical embodiment of acoustic section 5 contained in sonde 2, a pair of acoustic transmitters 100 and 101 are provided for delivering bursts of acoustic energy to the surrounding formation as desired in response to appropriate signals generated from well site system 11 or, alternatively, generated within sonde 2. It may further be seen that a corresponding pair of acoustic receivers 102 and 103 may be provided for receiving acoustic energy from the surrounding formation in response to the acoustic bursts delivered by transmitters 100-101. In the preferred mode of operation of acoustic section 5 according to the present invention, control signals from well site 11 which control the timing of the firing of transmitters 100 and 101 as hereinbefore noted my be preferably communicated on an appropriate conductor 104a of logging cable 7 to suitable transmitter logic circuitry 104. In like manner, receiver logic circuitry 110 may be provided for receiving signals preferably from the well site system 11 on conductor 110a of the logging cable. After processing the signal on conductor 104a which contains information regarding the order of transmitter firing and the like, logic circuitry 104 may be adapted to generate an output 104b to NOR gate 105.

In like manner, receiver logic circuitry 110 may transmit an appropriate signal 110b to NOR gate 105 containing information related to the order of receiver firing and the like carried on conductor 110a to receiver logic output signal 110b, NOR gate 105 may thereafter generate an appropriate output 105a to preamplifiers 112 and 113.

As hereinafter described in more detail, the purpose of output 105a is to control the gating of preamplifiers 112 and 113 to accept signals from a particular receiver 102 and 103 in a predetermined manner. It will be noted that NOR gate 105 may further provide a delay input signal 105b to appropriate delay circuitry 106 which functions to allow ample time for any transients on the logging cable 7 caused by logic pulses on conductors 110a and 104a or the like to disappear prior to energizing transmitters 100 or 101. Delay circuitry 106 may further serve the purpose of allowing time for transmitter and receiver gates obtained in preamplifiers 112-113 and in transmitter driver 109 to be set to their proper positions and to allow all transients generated by them to disappear. At the end of the hereinbefore noted delay generated by delay circuitry 106, a delay output 106a is delivered to a conventional dual NAND gate 107. It may be seen that NAND gate 107 is adapted so as to provide a transmitter switch signal 107a to transmitter switch 114, which, in turn, and in response thereto, transfers a transmitter switching signal 114a to a transmitter driver 109. The purpose of transmitter driver 109 is to transmit energy on its output 109a and 109b to transmitters 100 and 101, respectively, in response to transmitter switching signal 114a. This, in turn, will cause transmitters 100 and 101 to deliver bursts of acoustic energy into the surrounding formations in a conventional manner. It will be noted that transmitter driver 109, in order to supply energy to transmitters 100-101, is provided with appropriate power on line 108a from a conventional power supply 108 which preferably receives power from the well site system 11 on power supply conductor 108b. Upon receipt of acoustic energy from the surrounding formation in response to bursts of acoustic energy delivered by transmitters 100-101, the receivers 102-103 will deliver their outputs, which are functionally related to this energy received, on lines 102a and 103a to suitable preamplifiers 113 and 112, respectively. Outputs from these preamplifiers 113 and 112 will then be delivered on line 113a and 112a, respectively, to amplifier/buffer 111, wherein they are further amplified and transferred to suitable analog to digital converter circuitry on amplifier output 115 wherein they may be digitized and processed or they are directly transferred to well site system 11 on conductor 115a of logging cable 7 for digitization and processing. The processing of the digitized acoustic signature will be hereinafter explained in greater detail with reference to other drawings.

As hereinbefore explained, gating signal output 105a is provided to preamplifiers 112-113 in order to control, in a predetermined fashion, the time at which responses from receivers 102 or 103 are delivered to amplifier/buffer 111. In addition to amplifying acoustic signals on lines 112a and 113a for eventual transmission to the well site system 11, amplifier/buffer 111 may further generate a marker pulse in response to the output 107b from NAND gate 107. The purpose of this pulse is to provide indication that a transmitter has been energized in order to facilitate processing and the like of the acoustic signal contained on output 115 and 115a.

Figure 3:
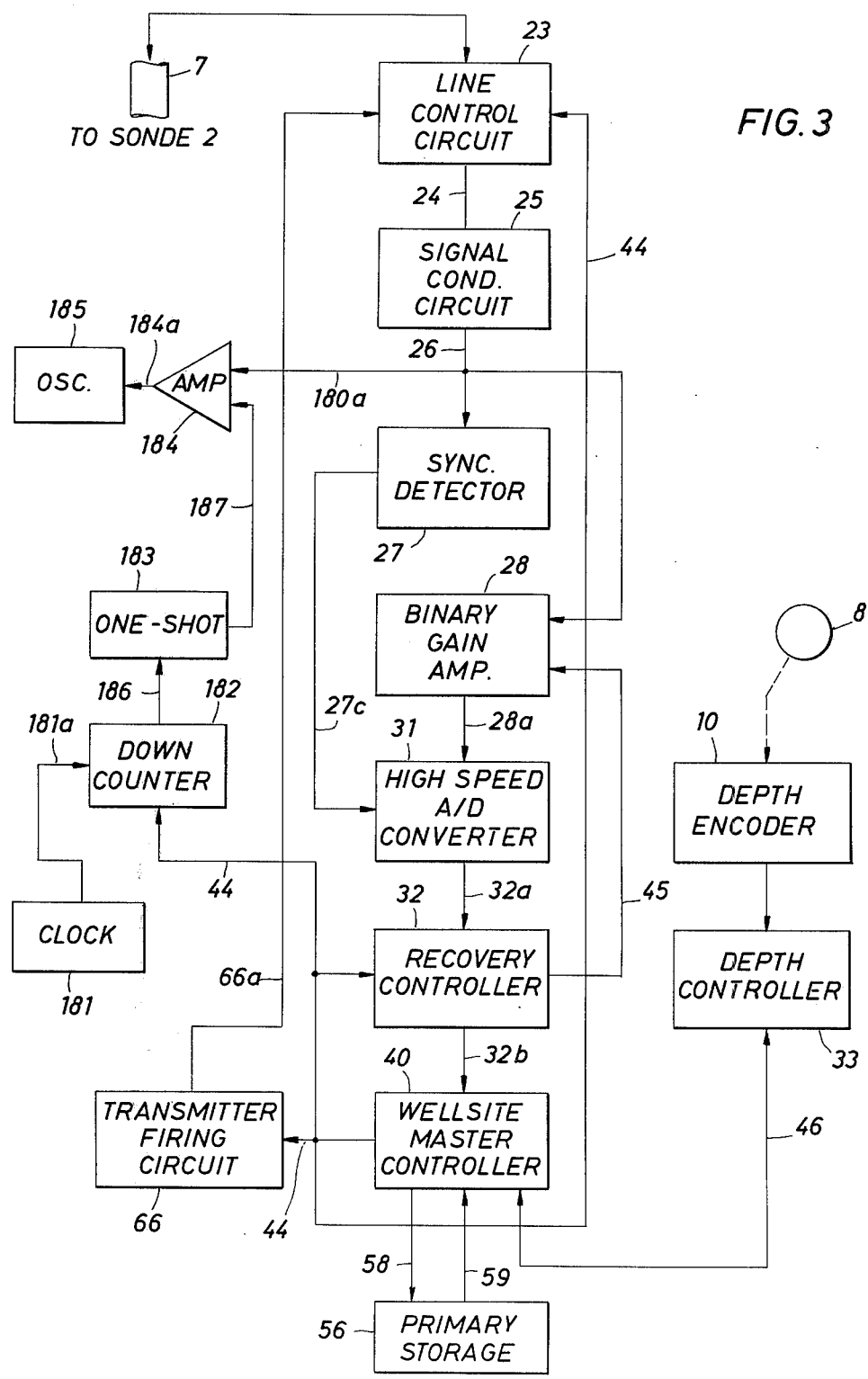
FIG. 3 is a more detailed functional representation of a portion of the surface circuitry depicted in FIG. 1.

Referring now to FIG. 3, there may be seen a greatly simplified functional diagram of a portion of the uphole circuits comprising the apparatus located at well site system 11 which illustrate a particular configuration of a portion of well site system 11 suitable for obtaining, processing, recording, storing, and the like, information associated with acoustic logging measurements, and more particularly, acoustic logging section 5. As may be seen from FIG. 3, controller 40 may preferably generate logging data command signals 44 which may be functionally related to depth of sonde 2 and may be derived from information provided to master controller 40 by depth controller 33 on depth data/control channel 46. Although in the preferred embodiment the firing of the acoustic transmitters is functionally related to the depth of the instrument in the borehole, it is contemplated that the transmitters can be controlled by time based pulsing, as is well known in the prior art. Command signal 44 may be communicated to a suitable transmitter firing circuit 66 which in turn generates transmitter firing signal 66a containing necessary information for acoustic logging section 5, including signals for triggering transmitters 100-101 and receivers 102-103 (shown in FIG. 2), and the like. Accordingly, firing signal 66a may be delivered to line control circuit 23 which, in turn, may be adapted by command signal 44 from master controller 40 to deliver firing signal 66a to the appropriate conductor of logging cable 7 so as to be communicated to transmitter logic circuitry 104 and receiver logic circuitry 110 of acoustic logging section 5 shown in FIG. 2.

Referring again to FIG. 3, it may, for purposes of illustration, be assumed that in response to a suitable transmitter firing signal 66a received by acoustic logging section 5 on logging cable 7, acoustic energy has been delivered to and received from the formation by acoustic logging section 5, and it may be further assumed that a functional response thereto is present on logging cable 7. Accordingly, and as more particularly illustrated in FIG. 3, these acoustic responses may conveniently be communicated on logging cable 7 to line control circuit 23 which may select the appropriate conductor of logging cable 7 containing these responses. These selected measurement signals may thereafter be transferred as output 24 to signal conditioning circuit 25 which may appropriately condition the signals on logging cable 7 for later processing. The conditioned signals 26 may thereafter be delivered to sync detector circuit 27. Output 27c of sync detector 27 is coupled to high speed analog-to-digital converter 31 providing an activation signal to converter 31 upon occurrence of a sync pulse at sync detector 27.

Conditioned signals 26 also input to binary gain amplifier 28. The output 28a of the binary gain amplifier 28 will then be delivered to high speed analog-to-digital converter 31 which has been activated by input 27c. In some cases the signals reaching binary gain amplifier 28 are of such magnitude that amplification or attenuation is not required. Accordingly, such signals are communicated directly to converter 31 through amplifier 28 without alteration. After conversion of the analog signals 28a by converter 31, these digital signals may thereafter appropriately be transferred to input 32a to recovery controller 32 and thereafter transferred to well site master controller 40 on line 32b for further transfer to primary storage 56 to permit real-time acoustic signature processing. A gain control signal 45 may be communicated to binary gain amplifier 28 from recovery controller 32 which, in turn, may derive appropriate gain control information from the master controller 40 which is transmitted to recovery controller 32 on data command signal line 44.

As further indicated in FIG. 3, it may be desirable to display various information associated with acoustic logging section 5 such as real-time acoustic signatures for purposes of monitoring and the like. Accordingly, a conventional oscilloscope 185 may be provided for such purposes. More particularly, acoustic information present on output 26 may be transferred as acoustic signature signal 180a to a suitable amplifier 184 and thereafter to the oscilloscope 185 on output 184a. Moreover, it may be a desirable feature to provide marker generator circuitry wherein information in addition to the acoustic signature signal 180a and functionally related thereto may be simultaneously displayed in the form of visible markers or indicators on oscilloscope 185. Accordingly, this circuitry may preferably be composed of a clock 181 which communicates timing signals on output 181a to a downcounter 182 which, in turn, may be conventionally arranged so as to compare signals from clock 181 with information from the master controller 40 communicated to downcounter 182 in data command signal 44. Upon such comparison, the counter 182 may preferably provide a counter signal 186 to a suitable one shot 183 which, in turn, may generate a conventional pulse output 187 which is transmitted to amplifier 184 for display on oscilloscope 185.

The operation of the circuitry of FIG. 3 can be better understood by reference to FIG. 4a, 4b, 4c, and the following description of acoustic signature processing to derive selected parameters as contemplated in the preferred embodiment of this invention. As herebefore stated, the acoustic signature 401 represented in FIG. 4a is transmitted from the acoustic logging section 5 of the subsurface sonde 2 by means of the logging cable 7. Line control circuit 23 selects the conductor within logging cable 7 which is carrying the acoustic signature 401 and transfers the waveform by input 24 to signal condition circuit 25. The conditioned signals 26 are simultaneously inputted into sync detector 27 and binary gain amplifier 28. Sync detector 27 determines the presence of synchronization pulse 402 of acoustic signature 401 indicating the firing of a transmitter within the borehole. Output 27c will then actuate high speed analog-to-digital converter 31 to allow the digitization of acoustic signature 401.

Conditioned signals 26 also inputs to binary gain amplifier 28. Amplifier 28 can either pass the acoustic signature unaltered or, as will be more fully explained later herein, can adjust the amplitude of the acoustic signature in response to a previous acoustic signature parameter so that the acoustic signature will fall within the optimum amplitude range to be digitized by A/D converter 31. This automatic gain control based on a control signal derived from a previous acoustic signature eliminates much of the hereinbefore mentioned problems due to constantly varying signal amplitudes and thus allows for more reliable acoustic signature parameter processings.

Output 28a of binary gain amplifier 28 is converted by high speed analog-to-digital converter 31 into a digital format. Although in the preferred embodiment a sample rate of 2 μseconds was chosen it is realized that the sample rate is a matter of engineering choice. The digital representation of the acoustic signature provides input 32a to recovery controller 32 which serves as a buffer between converter 31 and controller 40.

The digital representation of the acoustic signature, illustrated partially in FIG. 4b, is transferred from the recovery controller 32 to the well site master controller 40 by input 32b. Controller 40 transfers the digital representation of the acoustic signature to primary storage by input 58 where it is available to be processed before the acoustic signature generated by the next transmitter firing arrives at the surface electronics.

Figure 5:
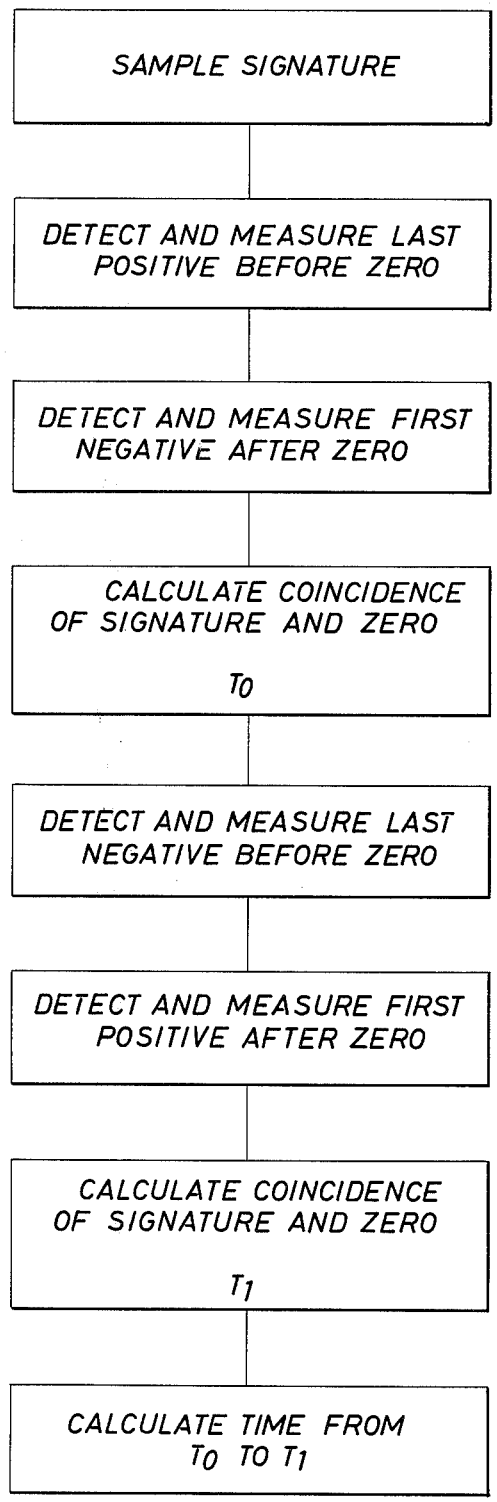
FIG. 5 is a flow chart of steps illustrative of a method to determine travel time of an acoustic impulse.

The processing of the acoustic signature to derive the parameter corresponding to velocity or travel time can be best understood by reference to FIG. 4b take in conjunction with FIG. 5. As hereinbefore stated, the detection of a sync pulse 402 by sync detector 27 initiates converter 31 so that the acoustic signature will be converted into digital format as represented by FIG. 4b. As shown in FIG. 4b the sync pulse 402 is also used to generate a waveform with a constant slope 403, which allows for an accurate first reference point to calculate velocity or travel time. The first reference point ($T_0$) 404 will be the point at which constant slope 403 crosses the zero voltage reference level 407 and will be found by determining the last positive sample 405 before crossing zero voltage reference level 407 and determining the first negative sample 406 after crossing level 407. Interpolation between 406 and 407 yields point ($T_0$) 404 as the point to initiate the time measurement for the signature being processed.

Again referring to FIG. 4b and FIG. 5, the digitized signature which possesses a characteristic shape is checked to find negative sample 408. Negative sample 408 will be the last negative sample before the received acoustic signal crosses zero voltage reference 407. The samples are then checked for detection and measurement of the first positive sample 409 after crossing zero voltage reference 407. With both samples 408 and 409 the exact point of coincidence 410 between zero voltage reference 407 and first arrival 411 can be found by interpolation and will yield the second measure point $T_1$ for the signature under process. The acoustic travel time for this particular firing of a transmitter is thus the time from first reference point ($T_0$) 404 to first measure point ($T_1$) 410. The process is repeated for each successive transmitter firing to provide time mesurement for each transmitter firing which can then be used in calculating average travel time as hereinbefore explained.

Before measurement point 410 will be accpeted as a true measure point first arrival it must comply with certain criteria. First arrival 411 is checked to determine that it is within a preselected amplitude range. The peak amplitude is calculated in the same fashion as the time measuring point and can be understood by reference to FIG. 4c. The first arrival is analyzed for the last sample on the positive slope 412 and the first sample on the negative slope 413. Interpolation between 412 and 413 yields the peak voltage point. The same analysis is done on second arrival 414 for purposes which will be more fully explained later in these specifications. Additionally, first arrival 411 is measured to determine that the number of samples present is above a minimum predetermined number and below a maximum predetermined number, thus assuring arrival 411 is of a desired shape, and size. By determining that first arrival 411 complies with established criteria it is assured that measure point 410 is not a product of spurious noise.

Once the amplitudes of first arrival 412 and second arrival 414 are determined the voltages are combined to generate control signal 45, of FIG. 3, which will be used to adjust the amplitude for the next acoustic signature generated by the identical transmitter-receiver pair. As before stated, amplifier 28 will be adjusted to optimize the amplitude of the acoustic signature for reliable processing.

In the preferred embodiment it is desirable to have maximum noise immunity so that the most accurate and reliable time measurement possible can be made. To aid in achieving this goal a noise rejection gate is utilized. After measure point 410, commonly referred to as the zero crossing point, has been determined a preselected amount of time is subtracted from the zero crossing point 410. On the following cycle of the same transmitter-receiver pair all samples after the first reference point ($T_0$) and before zero crossing point minus the preselected time interval will be ignored. In effect there is created a noise immunity gate which becomes effective immediately after measurement of the first reference point and terminated just prior to zero crossing measure point. Any noise which may be present on the acoustic signature after the first reference point and before the end of the noise immunity gate will not effect the time measurement. It should be recognized that the noise immunity gate represents a constant interval of time subtracted from the zero crossing point resulting in said noise immunity gate varying constantly in time in relation to the first reference point. By depending the noise immunity gate from formation velocity it is assured that first arrival 411 will not cross over to a point inside the noise immunity gate where it is rejected as noise or more so far away from the end of the noise immunity interval that the noise rejection function is lost, as could be the case if a noise immunity gate depended from the first reference point, as in the prior art.

As before stated, the entire acoustic signature is converted to a digital format for processing. By digitizing the complete signature, controller 40 continuously measures amplitude to determine the point at which the received acoustic waveform has die-out or diminished to the zero voltage reference level 407 as indicated generally at 415 in FIG. 4b. The determination that the entire received waveform has expired allows for optimization of the transmitter firing repetition rate. To more fully explain, the firing of the succeeding transmitter cycle can be altered in time so that shortly after a received waveform has died-out the next transmitter is initiated. The changing of the transmitter repetition rate is accomplished by either changing the speed at which the instrument traverses a borehole, in the instance of a depth synchronized firing method, or controller 40 can alter the firing rate, when using a time synchronized firing method. By continuously monitoring and altering the acoustic transmitter firing rate there is provided an optimized firing rate regardless of the formation being evaluated.

Many modifications and variations besides those specifically mentioned may be made in the techniques and structures described herein and depicted in the accompanying drawings without departing substantially from the concept of the present invention. Accordingly, it should be clearly understood that the forms of the invention described and illustrated herein are exemplary only, and are not intended as limitations on the scope of the present invention.

I claim:

1. A method of determining the travel time of acoustic energy in subsurface earth materials traversed by a borehole, comprising:

generating acoustic energy at a location within said borehole, detecting acoustic energy at a preselected distance from said location of acoustic energy generation, producing an electrical representation of the detected acoustic energy, relative to a preselected voltage level, transmitting said electrical representation to a surface location, deriving from said electrical representation a plurality of digital representation correlative to said detected acoustic energy, at preselected discrete time sampling intervals, determining from said digital representation a first point functionally related to said generating of acoustic energy and a second point functionally related to the first coincidence of said electrical representation of acoustic energy and said preselected voltage level, wherein said determining said second point further comprises selecting the first digital representation from said plurality having a value less than said preselected voltage level, selecting a second digital representation from said plurality derived next in time to said first digital representation, comparing said second digital representation to said preselected voltage level, repeating the above steps wherein said second digital representation becomes said first digital representation until said second digital representation, when compared to said preselected voltage level, has a value larger than said preselected voltage level, and storing said second digital representation, deriving an indication of the velocity of said acoustic energy over said preselected distance of said earth materials relative to the portion of said digital representation between said first and second points, generating a synchronization pulse as a function of the time of said generation of acoustic energy, generating from said pulse a constant negative slope waveform a predetermined time after said pulse generation having an initial value greater than said preselected voltage level and a final value less than said preselected voltage level prior to said coincidence, selecting the first digital representation from said representation having a value greater than said preselected voltage level, selecting a second digital representation from said representation generated next in time to said first representation, comparing said first and second digital representations.

* * * * *